United States Patent
Sugaya

(10) Patent No.: US 11,190,676 B2
(45) Date of Patent: Nov. 30, 2021

(54) IMAGE CAPTURE APPARATUS AND FOCUSING ADJUSTMENT METHOD FOR SAME

(71) Applicant: CANON KABUSHIKI KAISHA, Tokyo (JP)

(72) Inventor: Atsuto Sugaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/261,238

(22) Filed: Jan. 29, 2019

(65) Prior Publication Data
US 2019/0238757 A1  Aug. 1, 2019

(30) Foreign Application Priority Data
Feb. 1, 2018 (JP) .............................. JP2018-016476

(51) Int. Cl.
 *H04N 5/232* (2006.01)
 *H04N 5/235* (2006.01)
 *H04N 5/238* (2006.01)

(52) U.S. Cl.
 CPC ....... *H04N 5/232127* (2018.08); *H04N 5/238* (2013.01); *H04N 5/2352* (2013.01); *H04N 5/23212* (2013.01); *H04N 5/23216* (2013.01); *H04N 5/232125* (2018.08)

(58) Field of Classification Search
None
See application file for complete search history.

(56) References Cited

U.S. PATENT DOCUMENTS

| | | | |
|---|---|---|---|
| 5,091,742 A * | 2/1992 | Fukahori | G02B 7/36 396/123 |
| 6,700,615 B1 | 3/2004 | Satoh | |
| 10,419,658 B1 * | 9/2019 | Haynold | H04N 5/23222 |
| 2012/0197079 A1 * | 8/2012 | Kuriyama | A61B 1/00096 600/109 |
| 2014/0267869 A1 | 9/2014 | Sawa | |
| 2015/0215521 A1 * | 7/2015 | Shimada | H04N 5/23212 348/353 |

(Continued)

FOREIGN PATENT DOCUMENTS

| | | |
|---|---|---|
| CN | 101806988 A | 8/2010 |
| CN | 101808197 A | 8/2010 |
| CN | 104202518 A | 12/2014 |

(Continued)

*Primary Examiner* — Quan Pham
(74) *Attorney, Agent, or Firm* — Canon U.S.A., Inc., IP Division

(57) ABSTRACT

A focusing adjustment method includes calculating an in-focus level of an imaging optical system including a diaphragm and a focus lens based on an output signal of an image sensor, setting an optional focus lens position based on an instruction from a user, performing first control for determining a diaphragm driving direction and a diaphragm driving amount, based on the in-focus level; and performing second control for determining a moving direction of the focus lens, based on an output signal of the image sensor and determining a driving amount of the focus lens based on the diaphragm driving amount, wherein, in the first control and the second control, the diaphragm and the focus lens are controlled in such a range that a specific region of captured image can be included in depth of field.

8 Claims, 5 Drawing Sheets

(56) References Cited

U.S. PATENT DOCUMENTS

2016/0127631 A1* 5/2016 Terada ................ H04N 5/2351
348/222.1

FOREIGN PATENT DOCUMENTS

| CN | 107390344 A | 11/2017 |
| JP | 2012-173328 A | 9/2012 |
| JP | 2012181324 A | 9/2012 |
| WO | 2012/177495 A1 | 12/2012 |

* cited by examiner

IMAGE CAPTURE APPARATUS AND FOCUSING ADJUSTMENT METHOD FOR SAME

BACKGROUND OF THE INVENTION

Field of the Invention

The present invention relates to an image capture apparatus for uses such as surveillance.

Description of the Related Art

In an image capture apparatus designed for uses such as surveillance, all of the subjects to be monitored are desirably placed within a depth of field using a small aperture (closing side) of a diaphragm, from a standpoint of subject visibility. On the other hand, the small aperture of the diaphragm may increase the gain of a gain control circuit, and the gain increase may cause an increase in noise in an acquired image. Such a case should be prevented from a standpoint of the amount of data obtained.

Conventionally, an image capture apparatus which places a plurality of subjects within depth of field by controlling a diaphragm or a focus lens is known. For example, Japanese Patent Application Laid-Open No. 2012-181324 discusses an image capture apparatus that detects a plurality of specific subjects, measures a distance to each of the specific subjects, and then controls a diaphragm and a focus lens in such a manner that the mid-point half way between the specific subject in the closest distance and the specific subject in the farthest distance is substantially the center of depth of field.

The conventional technique discussed in Japanese Patent Application Laid-Open No. 2012-181324 needs to not only detect a specific subject (e.g., a person) but also to measure the distance to the specific subject. However, since every subject needs to be in focus in the image capture apparatus to be used for purposes such as surveillance, specifying a specific subject and designing a detection unit are difficult. Moreover, an apparatus for measuring the distance to the subjects is required. Such requirements increase the complexity of a configuration of the image capture apparatus.

SUMMARY OF THE INVENTION

The present invention is directed to an image capture apparatus that can maintain depth of field in an appropriate state.

According to an aspect of the present invention, an image capture apparatus includes an image sensor configured to capture a subject image, formed by an imaging optical system having a focus lens and a diaphragm, and to output an image signal, a memory device configured to store a set of instructions, at least one processor configured to execute a set of instructions to function as a calculation unit configured to calculate an in-focus level of the imaging optical system based on an output signal of the image sensor, a setting unit configured to set an optional focus lens position based on an instruction from a user, and a control unit configured to determine a diaphragm driving direction and a diaphragm driving amount based on the in-focus level, to determine a moving direction of the focus lens based on an output signal of the image sensor, and to determine a driving amount of the focus lens based on the diaphragm driving amount, wherein the control units are configured to control the diaphragm and the focus lens to be in such a range that a specific region of captured image can be included in depth of field.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

Exemplary embodiments are hereinafter described with reference to the drawings.

<Configuration of Image Capture Apparatus>

Each of the following exemplary embodiments is described using an example of an image capture apparatus integrally equipped with a lens barrel.

Figure 1:
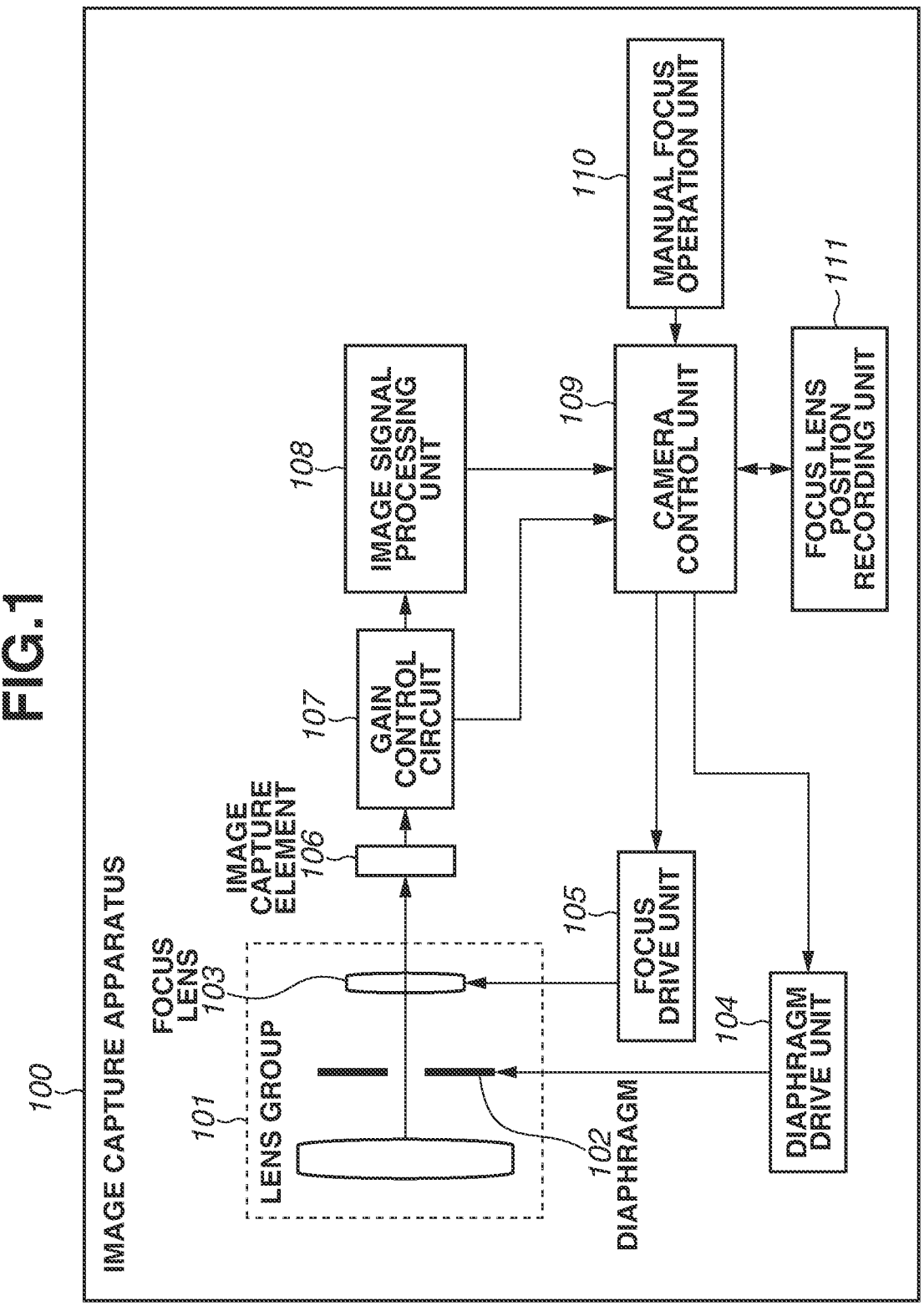
FIG. 1 is a block diagram illustrating an image capture apparatus according to a first exemplary embodiment.

FIG. 1 is a block diagram illustrating a configuration of main components of an image capture apparatus 100.

As illustrated in FIG. 1, the image capture apparatus 100, equipped with a lens barrel, includes a camera control unit 109 that comprehensively controls the operation of a lens group 101 and the image capture apparatus 100. The image capture apparatus 100 is controlled based on the data necessary for controlling the apparatus and a control program stored in a read only memory (ROM) (not illustrated) or a random access memory (RAM) (not illustrated) inside the camera control unit 109.

The lens group 101, as an imaging optical system, condenses incident light from a subject onto an image capture element 106. The lens group 101 includes a diaphragm 102 and a focus lens 103, and is driven by a diaphragm drive unit 104 and a focus drive unit 105.

The image capture element 106 converts light received at a light receiving plane into an electrical signal to capture a subject image, and outputs a signal. The output signal from the image capture element 106 is input to an image signal processing unit 108 via a gain control circuit 107 that automatically controls the amplitude of the electrical signal.

The image signal processing unit 108 performs various controls with respect to the signal which has been input, and calculates an evaluation value for an image signal. An example of the evaluation value includes an in-focus level that is a measure of the degree of focus of the image.

The camera control unit 109 calculates a diaphragm driving amount and a focus lens driving amount based on a gain of the gain control circuit 107 and an in-focus level calculated by the image signal processing unit 108, and controls the diaphragm drive unit 104 and the focus drive unit 105.

A manual focus operation unit 110 enables the setting of an optional focus lens position based on an instruction from a user. The manual focus operation unit 110 can be arranged in an image capture apparatus body, or can be externally arranged. If the manual focus operation unit 110 is externally arranged, an optional focus lens position can be set via a network. A focus lens position recording unit 111 records a focus lens position that is set using the manual focus operation unit 110.

Figure 2:
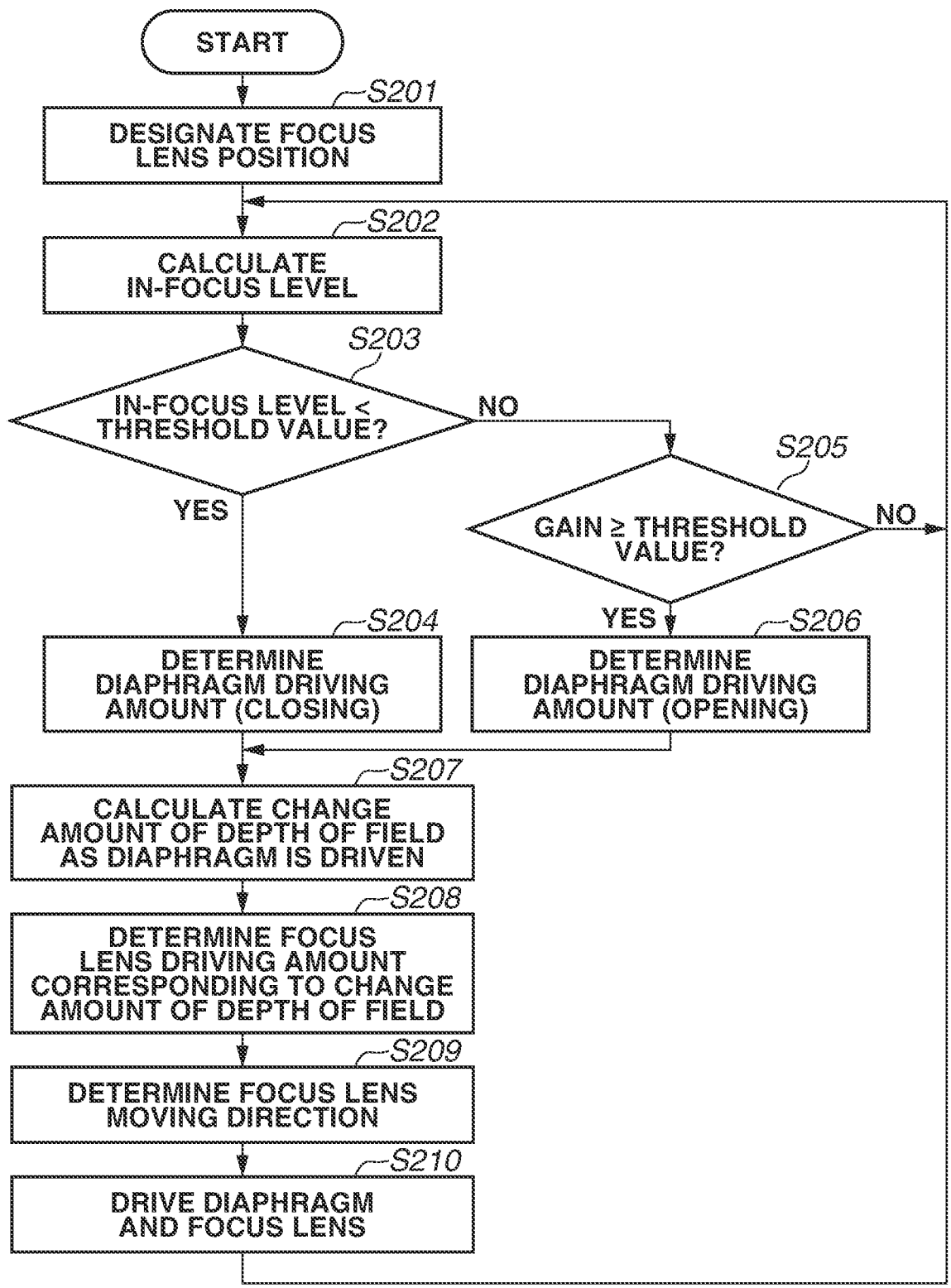
FIG. 2 is a flowchart illustrating depth-of-field control processing according to the first exemplary embodiment.

Hereinafter, depth-of-field control processing according to the first exemplary embodiment is described with reference to a block diagram illustrated in FIG. 1 and a flowchart illustrated in FIG. 2. The present exemplary embodiment is described using an image capture apparatus to be used for surveillance, as an example, in such an image capture apparatus, every subject is expected to be in focus. Accordingly, the image capture apparatus determines whether an in-focus level corresponding to an image or in-focus levels corresponding to a plurality of evaluation frames set within an image satisfy a predetermined criterion (a predetermined threshold value). If the in-focus level does not satisfy the criterion, processing for deepening depth of field more than the current depth-of-flied is performed.

In step S201, a user sets a focus lens position via the manual focus operation unit 110 such that a specific region of captured image (e.g., a path and a road) is in focus. Herein, the focus lens position recording unit 111 records the focus lens position.

In step S202, the image signal processing unit 108 calculates an in-focus level corresponding to an image. Herein, the in-focus level can be calculated by Expression (1)

$$TEP/MM \qquad (1)$$

This represents a signal acquired by differentiating TEP by MM that is a contrast difference signal. A large TEP/MM ratio indicates an in-focus state although the state indicated by a TEP/MM ratio depends on subject conditions. If the TEP/MM ratio is closer to zero, such a TEP/MM ratio indicates a large degree of blur. Accordingly, a gradient of luminance that changes from a black level to a white level can be expressed. Thus, a gradient is low (a small TEP/MM ratio) in a large blur, whereas a gradient is substantially vertical in an in-focus state and a TEP/MM ratio tends to become larger.

Herein, MM in Expression (1) is a Max-Min evaluation value that is generated as follows. A maximum value Max and a minimum value Min of a gamma-converted luminance signal Y are held for each horizontal line, the minimum value Min is subtracted from the maximum value Max, and then a difference between the maximum value Max and the minimum value Min is vertically peak-held to generate a Max-Min evaluation value. Moreover, TEP in Expression (1) is a TE peak evaluation value that is generated as follows. A high-frequency component of a gamma-converted luminance signal Y is extracted by a low-pass filter (LPF) (or a band-pass filter (BPF)) having a high cut-off frequency, and a peak value is determined for each horizontal line from a top evaluation (TE) signal of an output of the extracted high frequency component. The peak value is peak-held in a vertical direction to generate a TE peak evaluation value.

In step S203, the camera control unit 109 determines whether depth of field is insufficient based on the calculated in-focus level. In particular, if the calculated in-focus level is less than a threshold value for determining insufficiency of depth of field (YES in step S203), the camera control unit 109 determines that depth of field is insufficient. Then, the processing proceeds to step S204. Herein, the threshold value is set to 0.7 (approximately ⅔ of a maximum in-focus-level value).

However, a plurality of evaluation frames may be set in an image, and an in-focus level may be calculated for each evaluation frame. In such a case, the camera control unit 109 performs determination processing by using a threshold value for determining insufficiency of depth of field and a minimum in-focus level out of a plurality of in-focus levels. In general, if the sky or a non-textured wall is included as a subject, an in-focus level decreases. Consequently, if a frequency component of an image signal can also be calculated for each evaluation frame by the image signal processing unit 108, an in-focus level corresponding to an area in which a proportion of a low frequency component is higher than a criterion can be excluded from a target to undergo the above-described determination processing.

In step S204, the camera control unit 109 calculates a diaphragm driving amount to a closing side so that an in-focus level of an image or in-focus levels of a plurality of evaluation frames within an image are increased by causing depth of field to be deeper than the current depth of field. Then, the processing proceeds to step S207. Herein, a diaphragm driving amount is calculated so as to be proportional to a difference between an in-focus level and the threshold value in step S203. For example, an aperture is stopped down by one stop per 0.15 (approximately ⅙ of a maximum in-focus-level value) difference from the threshold value.

If the camera control unit 109 determines that the depth of field is not insufficient (NO in step S203), the processing proceeds to step S205.

In step S205, the camera control unit 109 refers to a gain of the gain control circuit 107 to determine whether the gain is a threshold value or more, which is defined based on a noise allowance. If the camera control unit 109 determines that a gain of the gain control circuit 107 is the threshold value or more (YES in step S205), the processing proceeds to step S206. In step S206, the camera control unit 109 calculates a diaphragm driving amount to an opening side to cause depth of field to be shallower than the current depth of field, and then the processing proceeds to step S207. Herein, a diaphragm driving amount can be calculated so as to be proportional to a difference between an in-focus level and the threshold value in step S203. Alternatively, a diaphragm driving amount can be calculated so as to be inversely proportional to a difference between the current focus lens position and a focus lens position recorded in the focus lens position recording unit 111. For example, an aperture is opened by one stop per 0.3 (approximately ⅓ of a maximum in-focus-level value, two times slower than a case in which a depth becomes deep; if a depth becomes shallow) difference from the threshold value. A diaphragm driving amount can be multiplied by $1/(1+\alpha \times \Delta F)$, where $\Delta F$ is a difference between the current focus lens position and a focus lens position recorded in the focus lens position recording unit 111, and $\alpha$ is an optional value. An operation in a direction in which a depth becomes shallower decelerates as a value of a is set larger.

If the camera control unit 109 determines that the gain is less than the threshold value defined based on the noise allowance (NO in step S205), the processing returns to step S202.

In step S207, the camera control unit 109 calculates an expected change amount of depth of field if the diaphragm is driven based on the calculated diaphragm driving amount. In step S208, the camera control unit 109 calculates a focus lens driving amount corresponding to the change amount of depth of field.

Herein, the focus lens driving amount is calculated by Expression (2) such that depth of field subsequent to drive of the diaphragm 102 and the focus lens 103 includes a focus position corresponding to a focus lens position set by a user $$\Delta d/2 = \Delta x \qquad (2),$$

where Δd is a change amount of depth of field, and Δx is an amount of movement of a focus position with movement of a focus lens.

Accordingly, a change amount of depth of field as the diaphragm is driven, is calculated from a diaphragm driving amount, and a focus lens driving amount is calculated such that a focus position is moved by a half the change amount of depth of field.

In step S209, the camera control unit 109 determines a focus lens moving direction. Herein, if drive of the diaphragm 102 makes the depth of field shallower, a direction toward a focus lens position recorded in the focus lens position recording unit 111 is set to a focus lens moving direction. If drive of the diaphragm 102 makes the depth of field deeper, a focus lens is minutely driven by predetermined wobbling width to set a direction in which a high-frequency component of an image signal increases to a focus lens moving direction. However, such focus lens moving direction determination by minutely driving the focus lens may be performed only if a magnitude relation between an in-focus level and the threshold value in step S203 changes.

In step S210, the camera control unit 109 controls driving of the diaphragm 102 and the focus lens 103 based on the diaphragm driving amount and the focus lens driving amount. Herein, drive start timing and driving speed of the drive of the diaphragm 102 are set to be substantially the same as or faster than those of the drive of the focus lens 103 such that depth of field includes a focus position corresponding to a focus lens position set by a user even during drive control.

The processing in step S203 has been described using the method in which excessive or insufficient depth of field is determined based on a single threshold value. However, if an in-focus level and the threshold value in step S203 are similar values, a hunting phenomenon occurs in which processing for providing deeper depth of field and processing for providing shallower depth of field alternate. Accordingly, an in-focus level threshold value for determining insufficient depth of field as well as an in-focus level threshold value for determining excessive depth of field may be set. Herein, if an in-focus level is less than the threshold value for determining insufficient depth of field, a diaphragm driving direction is set to an opening side. If an in-focus level is the threshold value for determining excessive depth of field or more, a diaphragm driving direction is set to a closing side. Accordingly, if the in-focus level is the threshold value for determining insufficient depth of field or more and less than the threshold value for determining excessive depth of field, processing for directly returning to step S202 may be added. In this case, the threshold value for determining excessive depth of field is set to be greater than the threshold value for determining insufficient depth of field.

Such processing is repeated, so that a state in which a focus position corresponding to a focus lens position set by a user is included in depth of field is maintained, and suitable depth of field can be acquired. Accordingly, a diaphragm and a focus lens can be driven in a range in which a specific region of captured image can be included in depth of field.

Figure 3:
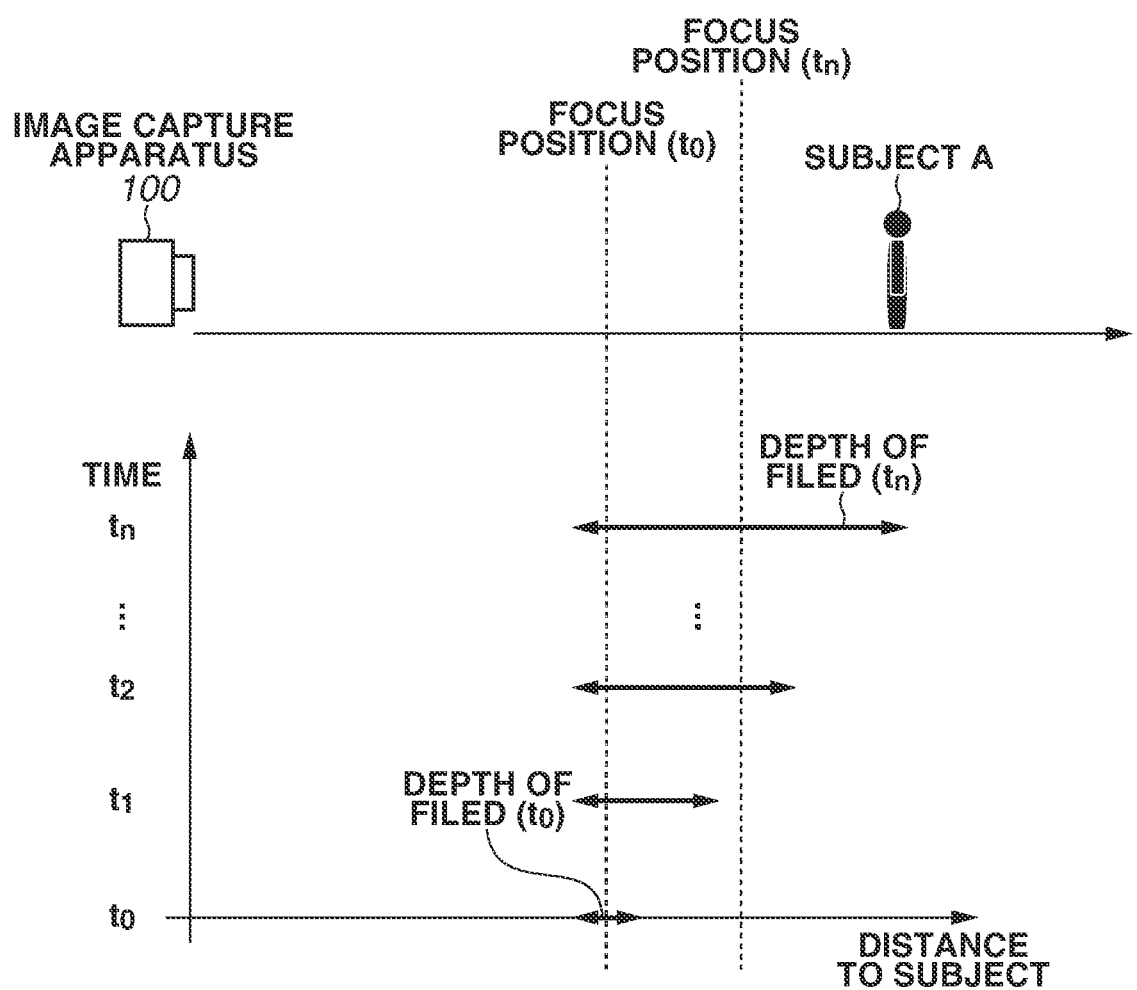
FIG. 3 is a diagram illustrating a relation between depth of field and a focus position in the depth-of-field control processing.

FIG. 3 is a simple diagram illustrating one example of a change in the depth of field made in the above-described processing. In FIG. 3, n represents the number of repetitions of processing until a subject 1 is included in depth of field, t0 represents a processing start time, and tn represents a time needed for processing for n times. Moreover, a focus position in t0 is a position corresponding to a focus lens position set by a user.

Figure 4:
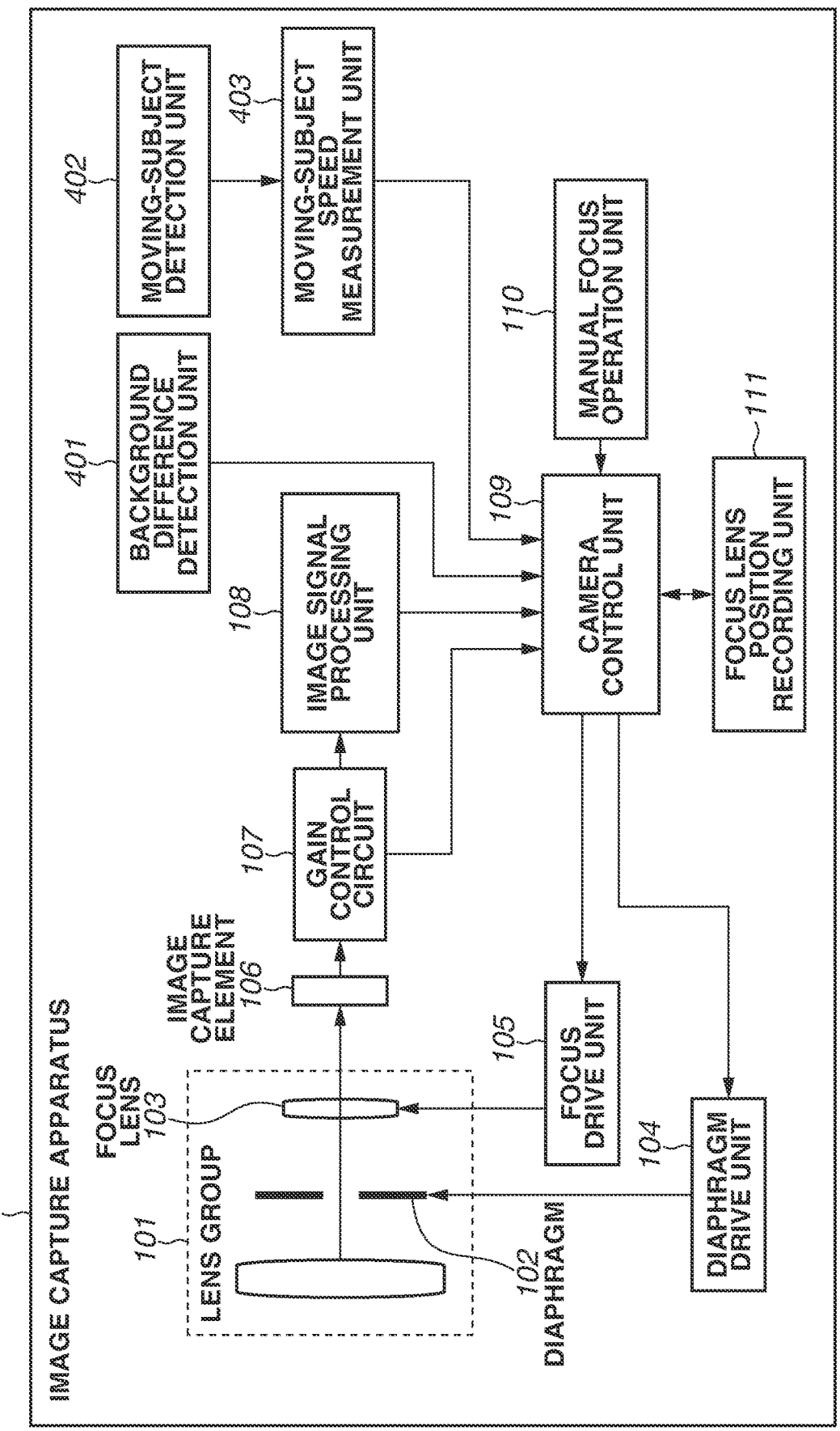
FIG. 4 is a block diagram illustrating an image capture apparatus according to a second exemplary embodiment.

FIG. 4 is a diagram illustrating a configuration of an image capture apparatus according to a second exemplary embodiment.

Figure 5:
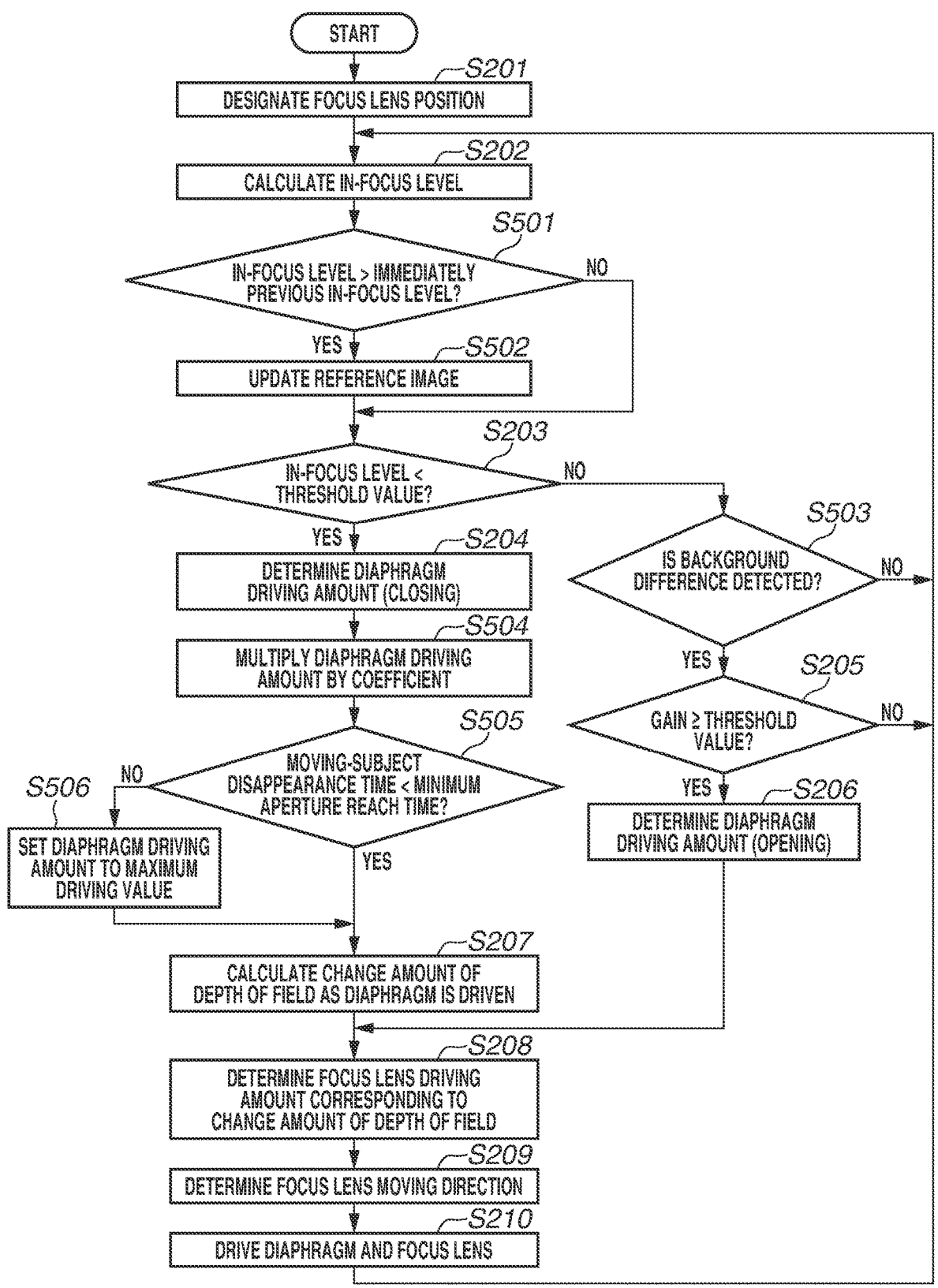
FIG. 5 is a flowchart illustrating depth-of-field control processing according to the second exemplary embodiment.

Depth-of-field control processing according to the second exemplary embodiment is described with reference to a block diagram illustrated in FIG. 4 and a flowchart illustrated in FIG. 5. Descriptions of configurations that are similar to those of the image capture apparatus according to the first exemplary embodiment are omitted.

As illustrated in FIG. 4, the image capture apparatus of the second exemplary, embodiment includes a background difference detection unit 401, a moving-subject detection unit 402, and a moving-subject speed measurement unit 403, in addition to the configurations illustrated in FIG. 1. The background difference detection unit 401 calculates a difference between a past captured image as a reference image and a current captured image, and uses the calculated difference to detect appearance, disappearance, and movement of a subject. The background difference detection unit 401 may detect appearance, disappearance, and movement of a subject by using a histogram difference instead of the image difference. The moving-subject detection unit 402 and the moving-subject speed measurement unit 403 detect a moving subject within the subject, and estimate a speed. Speed estimation such as a conventional speed estimation using a motion vector can be used. If there is a plurality of moving subjects within an image, a maximum moving-subject speed out of a plurality of moving-subject speeds is output.

Since the processing for providing the deeper depth of field or for providing the shallower depth of field is desirably performed fewer times as possible from a standpoint of durability of a drive unit, such processing is preferably performed only if a change occurs in a subject such as appearance, disappearance, or movement of the subject inside the depth of field. However, since the processing for providing the deeper depth of field or for providing the shallower depth of field described in the first exemplary embodiment is started after determination based on an in-focus level and the threshold value in step S203, the processing for providing the shallower depth of field can be performed without disappearance or movement of the subject.

In the second exemplary embodiment, the following processing is added. In step S503, a camera control unit 109 determines whether processing for providing shallower depth of field is to be started, based on an output of the background difference detection unit 401. Moreover, in step S501, the camera control unit 109 determines whether an in-focus level has exceeded an immediate previous in-focus level that has been calculated, and in step S502, the camera control unit 109 updates a reference image to be used for background difference detection.

Moreover, if there is a moving subject in the subject, it is conceivable that the moving subject may disappear from an image before the moving subject is included in depth of field depending on a speed of the moving subject. Accordingly, the camera control unit 109 changes a diaphragm driving amount in response to an output of the moving-subject speed measurement unit 403.

In step S504, the camera control unit 109 multiplies a diaphragm driving amount calculated similar to the first exemplary embodiment, by a coefficient proportional to a moving-subject speed, based on the output of the moving-subject speed measurement unit 403. Moreover, in step S505, the camera control unit 109 estimates a time in which the diaphragm reaches a minimum aperture, based on the diaphragm driving amount multiplied by the coefficient, and compares the estimated reach time with a time in which the moving subject disappears from a screen if the moving subject performs linear motion at a constant speed. Herein, if the camera control unit 109 determines that the moving subject will disappear from the screen before the minimum aperture is reached, the processing proceeds to step S506. In step S506, the camera control unit 109 sets the diaphragm driving amount to a maximum driving value as a maximum drivable amount.

By adding such processing, not only unnecessary drive can be suppressed in comparison with the first exemplary embodiment, but also depth-of-field control based on a moving-subject speed can be performed.

Each of the exemplary embodiments can provide an image capture apparatus that maintains depth of field in an appropriate state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (WU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2018-016476, filed Feb. 1, 2018, which is hereby incorporated by reference herein in its entirety.

What is claimed is:

1. An image capture apparatus comprising:
an image sensor configured to capture an image, formed by an imaging optical system having a focus lens and a diaphragm, and to output an image signal;
a memory device configured to store a set of instructions;
at least one processor configured to execute the set of instructions to function as:
a manual focus setting unit configured to set a focus lens position for a first object based on an instruction from a user;
a calculation unit configured to calculate an in-focus level of a second object corresponding to an evaluation frame set on the image based on an output signal of the image sensor after setting of the focus lens position by the manual focus setting unit; and
a control unit configured:
to determine a diaphragm driving direction and a diaphragm driving amount, the diaphragm driving amount being calculated to be proportional to a difference between the in-focus level and a predetermined threshold value,
to determine a moving direction of the focus lens based on the output signal of the image sensor,
to determine, based on the determined diaphragm driving amount, an expected change amount of depth of field as the diaphragm is driven, and
to determine a driving amount of the focus lens corresponding to the determined expected change amount of depth of field,
wherein the control unit controls the diaphragm and the focus lens such that both of the first object corresponding to the focus lens position set by the setting unit and the second object are included in depth of field, and
wherein the control unit is configured to set the diaphragm driving direction to an opening side if the in-focus level is the predetermined threshold value or more, and to set the diaphragm driving direction to a closing side if the in-focus level is less than the predetermined threshold value.

2. The image capture apparatus according to claim 1, wherein the control unit is configured:
to set a moving direction of the focus lens toward a focus lens position stored in a storage medium if the diaphragm is driven in a direction toward an opening side, and
to minutely drive the focus lens by predetermined wobbling width to set the moving direction of the focus lens to a direction in which a high frequency component of an output signal of the image sensor increases if the diaphragm is driven in a direction toward a closing side.

3. The image capture apparatus according to claim 1, wherein the control unit is configured:
to calculate a focus lens driving amount such that a focus position is moved by a half of the change amount of the depth of field.

4. The image capture apparatus according to claim 1, wherein the control unit is configured to drive the diaphragm before driving the focus lens.

5. The image capture apparatus according to claim 1, further comprising a gain control circuit, wherein the control unit is configured to drive the diaphragm to an opening side if a gain of the gain control circuit shows a predetermined threshold value or more.

6. The image capture apparatus according to claim 1, wherein the at least one processor configured to execute the set of instructions to further function as: a detection unit configured to detect at least one of appearance, disappearance, and movement of an object,
  wherein in a case where the detection unit detects at least one of appearance, disappearance, and movement of an object, the control unit performs the control of the diaphragm and the focus lens.

7. A focusing adjustment method for an image capture apparatus including an image sensor for performing photoelectric conversion on a luminous flux having passed through an imaging optical system including a focus lens and a diaphragm and performing output of an image signal, the focusing adjustment method comprising:
  manual focus setting a focus lens position for a first object based on an instruction from a user;
  calculating an in-focus level of a second object corresponding to an evaluation frame set on the image based on an output signal of the image sensor after setting the focus lens position by the manual focus setting;
  performing first control for determining a diaphragm driving direction and a diaphragm driving amount, the diaphragm driving amount being calculated to be proportional to a difference between the in-focus level and a predetermined threshold value;
  performing second control for determining a moving direction of the focus lens based on an output signal of the image sensor;
  performing third control for determining, based on the determined diaphragm driving amount, an expected change amount of depth of field as the diaphragm is driven; and
  performing fourth control for determining a driving amount of the focus lens corresponding to the determined expected change amount of depth of field,
  wherein, in performing the first control, the second control, the third control, and the fourth control, the diaphragm and the focus lens are controlled such that both of the first object corresponding to the focus lens position set and the second object detected are be included in depth of field, and
  wherein, in performing the first control, the diaphragm driving direction is set to an opening side if the in-focus level is the predetermined threshold value or more, and the diaphragm driving direction is set to a closing side if the in-focus level is less than the predetermined threshold value.

8. A non-transitory computer readable storage medium storing a program that, when executed on an image capture apparatus, causes the image capture apparatus to perform the focusing adjustment method according to claim 7.

* * * * *